July 21, 1925.
C. P. DUBBS
1,546,634
APPARATUS FOR TREATING PETROLEUMS
Original Filed June 21, 1919
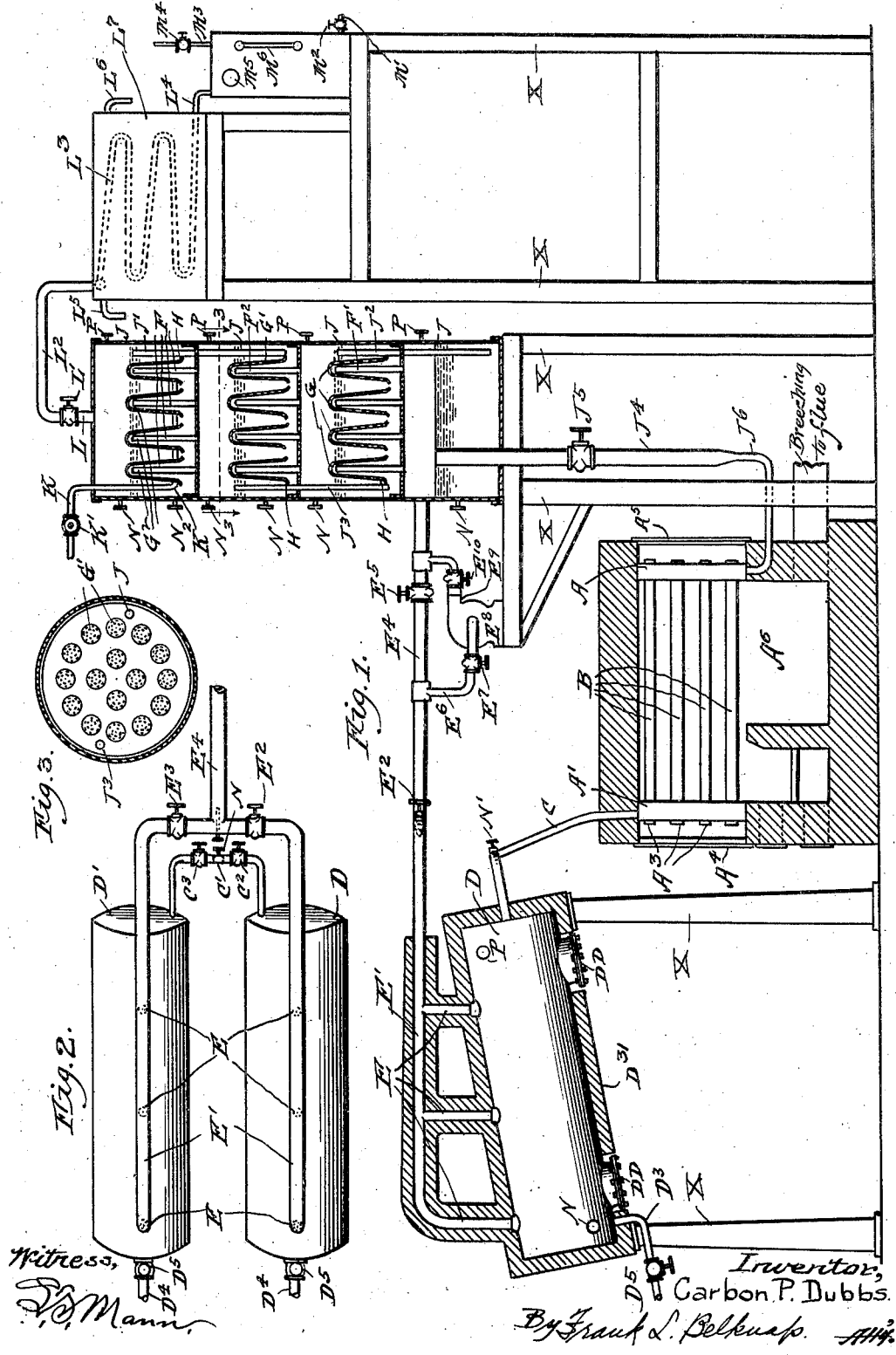
Witness,
S. S. Mann.
Inventor,
Carbon P. Dubbs.
By Frank L. Belknap, Atty.

Patented July 21, 1925.

1,546,634

UNITED STATES PATENT OFFICE.

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA.

APPARATUS FOR TREATING PETROLEUM.

Original application filed June 21, 1919, Serial No. 305,793. Divided and this application filed September 6, 1921. Serial No. 498,887.

*To all whom it may concern:*

Be it known that I, CARBON P. DUBBS, a citizen of the United States, residing in the town of Wilmette, county of Cook, and State of Illinois, have invented certain new and useful Improvements in Apparatus for Treating Petroleum, of which the following is a specification.

This application is a divisional of an original application filed June 21, 1919, Serial No. 305,793, upon which Patent No. 1488325 was issued March 25, 1924.

This invention relates to an apparatus for treating petroleum and other hydrocarbons to produce therefrom, products having lower boiling points.

The invention contemplates an apparatus for continuously treating petroleum; an apparatus whereby petroleum is passed through a heating zone, then through a vaporizing chamber, wherein part of it remains liquid containing such solids originally in the oil or formed while being heated, the liquid being intermittently or continuously drawn from such vaporizing chamber and carrying with it more or less of the solid matter; an apparatus in which the vapors liberated in the vaporizing zone are passed through a series of pools of liquid oil subjecting the vapors to a dephlegmating action; an apparatus in which the circulation of the vapors may be controlled by a pump interposed in the vapor line; an apparatus which utilizes the raw oil as a reflux condensing agent, the reflux condensate combining with the raw oil prior to its being introduced to the heating zone; an apparatus whereby an increased amount of the heat generated is utilized in the system; an apparatus in which the raw oil is caused to circulate down through successive pools maintained in the dephlegmator, subjecting the vapors bubbling therethrough to a refluxing action, the raw oil and condensate being drawn off from the bottom of the dephlegmator; an apparatus whereby the oil under treatment is heated in one stage and such heat treatment so controlled and regulated as to prevent any substantial deposition of carbon in such zone; an apparatus in which the oil to be treated is fed continuously or intermittently by passing it through succeeding pools of oil before being passed to the cracking tubes, such oil being freed of that portion having the desired low boiling points while dephlegmating the vapors in said pools; and in general to provide an improved apparatus of the character referred to.

In the drawings:

Fig. 1 is a diagrammatic side elevation in section of my improved apparatus.

Fig. 2 is a top plan view of the vaporizing chambers and the immediate piping.

Fig. 3 is a top cross sectional view of that section of Fig. 1, in which the pools of oil are shown. This is a cross section taken on the line 3—3 of Fig. 1.

In describing the attached drawing, and operation of the apparatus, the oil to be treated is drawn from a source (not shown), and is forced into the apparatus through valve marked $K^1$, through line K, through the perforated line $K^2$, which latter line extends across the bottom of the top pool of oil in the chamber marked $L^x$. The oil vapors which percolate up through this pool of oil are passed off through vapor line L, through the pressure regulating valve $L^1$, through gooseneck $L^2$, to condensing coil $L^3$ positioned in condensing tank $L^7$, thence through line $L^4$ into tank M, along with the incondensable gases. Water is fed to tank $L^7$ through line $L^5$ and travels out of said tank through line $L^6$. The condensate collected in tank M is drawn off through line $M^1$ having positioned thereon pressure regulating valve $M^2$, while the incondensable gas is drawn off through line $M^3$ through pressure regulating valve $M^4$ and on this tank is a liquid level gauge $M^6$ and a pressure gauge $M^5$. Tanks M and $L^7$ rest on the supports marked X.

The level of the top pool of oil in the chamber $L^x$ is maintained approximately at J and any surplus flows through pipe $J^1$ into the pool of oil directly thereunder, the level of this pool being maintained at point marked J. Any excess travels through line $J^3$ into the bottom of the pool of oil immediately thereunder, the level of the oil in each pool being maintained at the points indicated J and any excess travelling through the line $J^2$ into the pool of oil immediately thereunder and this pool is maintained at a level marked J and any excess travels through line $J^4$, having positioned on it valve $J^5$. At the bottom of the line $J^4$, the cross sectional area is reduced as shown at J⁶, the larger sized pipe used in J⁴ being for the purpose of allowing the oil to be, more or less, freed of any vapors contained therein, such vapors passing back up through said pipe into the bottom of the chamber L˟. The liquid passes through line J⁶ into header A, and passes through lines B into header A¹. In each of these headers opposite each end of the tubes B are positioned plugs A³, for the purpose of allowing entry to said tubes for cleaning same and opposite these plugs are furnace doors A⁴ and A⁵ which by opening give ready access to said plugs.

The tubes B and headers A and A¹ are positioned in the furnace A⁶. As the oil passes through these tubes B from header A into header A¹, it is subjected to heat, which converts a portion into lower boiling point products, and the oil flows from header A¹ through line C, into header C¹, having positioned therein pyrometer N and through valve C² into retort D, which retort has manholes marked Dᴰ, pressure gauge P.

As the oil passes through tank D, a proportion of same is vaporized and passes up through vapor lines E into header E¹, and through valve E² into line E⁴. Through the line E⁴, the valve E⁵ being opened while the valves E⁷ and E¹⁰ are closed, the vapors pass into the bottom compartment of the chamber L˟. Any proportion condensing drains into the bottom compartment of chamber L˟, and is automatically returned to the heating tubes B through lines J⁴ the valve J⁵ being open. The uncondensed portion passes up through the pipes marked F¹ and by means of caps G are forced downwardly and discharged near the bottom into the pool of oil in that chamber. The bottoms of the caps marked G are perforated at the points marked H. The vapors as they bubble up through this pool of oil give up more or less of their heat and more or less of the vapors are condensed and as they bubble up through this liquid, they are more or less scrubbed. The excess oil accumulated in this pool travels through pipe J² into the pool of oil contained in the compartment directly thereunder, the pipe J² extending down into the pool of oil to a point near the bottom, thus forming a liquid seal so that no vapors contained in the lower chamber can pass up through pipe J² into the upper chamber. The remaining vapors pass up through pipes F² and are forced by means of caps G¹ downwardly to a point near the bottom of the pool of oil contained in this chamber and there escape into said pool of oil through the perforations at a point marked H in said caps or if these are not of sufficient capacity, the excess vapors can pass clear down under the bottom of the caps and escape up through the oil from that point.

As such vapors percolate up through this pool of oil, more or less of the heat in same is extracted and acquired by the pool of oil, thus causing more or less of the vapors to condense and be retained in such pool of oil and act to have a scrubbing effect on remaining vapors. The surplus oil accumulating in this chamber travels through pipe J³ into the pool contained in the chamber immediately thereunder, such pipe extending to near the bottom of said latter pool, so as to prevent any vapors passing therethrough from the latter chamber up into the former chamber. The remaining vapors in the last mentioned pool pass up through pipes F and by means of caps G² are forced down to near the bottom of the pool of oil contained in this chamber and are there discharged into said pool of oil through the perforated places marked H or by passing completely under the bottom of caps G² and as they percolate up through this pool of oil, more or less heat is extracted therefrom and retained in the oil forming this pool, which causes more or less of such vapors to be condensed and retained in this pool of oil and the surplus of such oil overflows through pipe J¹ into the pool immediately thereunder, being discharged in said pool near the bottom so as to prevent any vapors in said lower chamber passing through this pipe into the upper chamber. There may be as many pools of oil as are shown in the chamber L˟ or as desired or found necessary to sufficiently scrub the vapors passed therethrough and to reduce and condense any desired portions of the vapors to produce the desired boiling point, the remaining vapors passing from said chamber L˟ through pressure regulating valve L¹, through gooseneck L² as already described. These pools of oil may be contained in one chamber as shown in the drawing and marked L˟ or in more than one chamber. The excess oil in the bottom pool of each chamber being returned to the heating pipes B in the same manner as shown in the drawing, and as this will be readily understood by those versed in the art, I have not deemed it necessary to show more than one chamber marked L˟.

In case it is desired to stimulate the flow of vapors from the vaporizing chamber into and through the chamber L˟, a pump is provided marked E⁸ and connected to the vapor line E⁴ by means of line E⁶, having positioned on it valve E⁷ and on the discharge side of the pump it is connected to vapor line E⁴ by line E⁹, having positioned on it valve E¹⁰. To use this pump for pumping, the valve E⁵ in line E⁴ would be closed and valves E⁷ and E¹⁰ would be opened, and the pump put in operation, thereby causing the vapors to travel from line E⁴ through line E⁶, through pump E⁸, through E⁹, back into line E⁴ on the opposite side of the valve E⁵ from which the vapors were originally drawn from line E⁴.

In different parts of this vaporizing chamber are shown pyrometers marked N and pressure gauges marked P. The chamber L^x and pump E⁸ are positioned on supports marked X. The portion of oil in the vaporizing chamber D remaining unvaporized is drawn off either continuously or intermittently through line D³, through valve D⁵ and with it is carried off more or less of the carbon formed in the cracking of the oil. Vaporizing chamber D is duplicated, as shown, in vaporizing chamber marked D¹. This is for the reason that when it becomes necessary to clean vapor chamber D, the rest of the apparatus can be kept in operation by diverting the flow of heated oil coming from the heating tubes B into the other vaporizing chamber D¹ by the opening of valve C³ and the vapors passed therefrom by the opening of valve E³. The unvaporized portion in tank D¹ is drawn off through valve D⁵ through line D⁴ and the discharge of the heated oil into tank D is stopped by the closing of valves C². In due time, the manholes marked D—D on this latter tank can be opened and the tank cleaned; said tank will be ready to be put back in service by the time it becomes necessary to clean tank D¹, this being done by the closing of valves C³, and E³ and the opening of valves C² and E². These vapor chambers are supported by supports marked X. Said vaporizing chambers and vapor line marked E and section of vapor line marked E¹ are heavily insulated as indicated by D³¹ in Fig. 1. The purpose of such insulation is for preventing loss of heat from this section and to prevent any portion of the oil, after once being vaporized, from condensing and mixing with that portion remaining in the vapor chamber unvaporized. These vapor chambers are maintained only partly full of oil.

It will be noted that the raw oil is fed into the top or last pool of oil, which is of the lowest temperature and flows from there into the next succeeding pool of oil, which is higher in temperature and then to the next, which is still higher, etc., thus being progressively subjected to increasing temperatures and also mixed with such oils as are condensed in these pools of oil and such mixture returned for further heating. Thus, the raw oil being fed in is being preheated before passing to the heating coils B and thus utilizing more or less of the heat given up by the vapors. It is to be noted that by this novel arrangement the raw oil fed through the pools is preheated, and also the condensate resulting from the condensation of heavier vapors maintained in a hot condition. The oil accumulating in the dephlegmator is discharged to the cracking oil through the line J⁴.

Among other advantages of this process are the control of the amount of cracking done on each passage of the oil through the heating or cracking tubes B, the separation and withdrawal from the apparatus of the unvaporized portion remaining in the vapor chamber along with more or less of the carbon formed, the fractional condensing of the vapors generated and the return to the heating tubes of those fractions of not sufficiently low boiling point. These fractions which are returned to the heating tubes represent the reflux condensate and do not have any free carbon content.

It will also be observed that in this arrangement, great economy in fuel will be gained. The temperature to which the oil is heated may vary from a minimum of 200 degs. F. to 600 degs. F., and from a maximum of 600 degs. F. to 1500 degs. F. While the pressure maintained may vary from minimum to a few pounds to the square inch to a maximum of 800 pounds to the square inch. These ranges of temperature and pressure are by no means arbitrary.

I claim as my invention:

1. An apparatus for converting oil, comprising a furnace, a heating coil therein, an enlarged insulated chamber disposed outside of said furnace, an insulating wall around said chamber, a transfer line between the heating coil and the chamber, a dephlegmator disposed at an elevation above the heating coil in said furnace, a vapor transfer line from said chamber to said dephlegmator, a residual drawoff line leading from the chamber, means for introducing charging stock to the dephlegmator to absorb heat from the vapors passing therethrough and to preheat the charging stock, means for collecting a body of said charging stock and reflux condensate, a communication between said collecting means and the heating tubes for introducing the charging stock and reflux condensate to the heating tubes, and means for maintaining a superatmospheric pressure on the oil undergoing conversion.

2. An apparatus for converting oil, comprising a furnace, a heating coil therein, an enlarged chamber disposed outside of said furnace, a transfer line establishing communication between said chamber and the heating coil in the furnace, means surrounding said chamber to prevent an excessive drop in the temperature of the oil therein, means for withdrawing residual oil from the body of oil maintained in said chamber without admitting the same to the heating coil, a vapor transfer line in communication with said chamber, a dephlegmator disposed at an elevation above said heating coil and in communication with said vapor transfer line, means for introducing charging stock to the dephlegmator to condense insufficiently cracked vapors and to preheat the charging stock, means for collecting an accumulated body of such preheated charging stock and reflux condensate, means for delivering oil from said body to the inlet side of the heating coil to pass therethrough, and means for maintaining a superatmospheric pressure on the oil undergoing conversion.

3. An apparatus for converting oil comprising a furnace, a heating coil therein for heating a stream of oil to a cracking temperature, an enlarged chamber disposed outside of the furnace, means for delivering the heated stream of oil to said chamber, means for preventing an excessive drop in the temperature of the oil in said chamber, means for withdrawing residual oil from the chamber without admitting the same to the heating coil, a vapor transfer line in communication with said chamber, dephlegmating means disposed away from said heating coil and furnace and in communication with said vapor transfer line, means for passing charging stock to the said dephlegmating means in heat transfer relation with the vapors therein to condense the insufficiently cracked vapors and to preheat the charging stock, means for passing the preheated charging stock and reflux condensate to the inlet side of the heating coil, and means for maintaining a superatmospheric pressure on the oil undergoing conversion.

4. An apparatus for converting oil, comprising a furnace, a heating coil therein for heating a stream of oil to a cracking temperature, an enlarged chamber disposed outside of the furnace, means for delivering the heated stream of oil to said chamber, means for preventing an excessive drop in the temperature of the oil in said chamber, means for withdrawing residual oil from the chamber without admitting the same to the heating coil, a vapor transfer line in communication with said chamber, dephlegmating means disposed away from said heating coil and furnace, and in communication with said vapor transfer line, means for passing charging stock to the said dephlegmating means in heat transfer relation with vapors introduced thereto, to condense the insufficiently cracked vapors and to preheat the charging stock, means for collecting a plurality of separate oil pools in said dephlegmating means through which oil pools said vapors must pass, means for passing the preheated charging stock and reflux condensate to the inlet side of the heating coil and means for maintaining a superatmospheric pressure on the oil undergoing conversion.

CARBON P. DUBBS.